United States Patent
Rotte et al.

(10) Patent No.: US 7,564,484 B2
(45) Date of Patent: Jul. 21, 2009

(54) SYNCHRONISING A BASE UNIT AND A CAMERA UNIT WHICH ARE CONNECTED BY TWO OPPOSITE-DIRECTION DIGITAL VIDEO SIGNAL CONNECTIONS

(75) Inventors: Jeroen Rotte, Breda (NL); Pepijn Kampf, Breda (NL); Rob Voet, Rijen (NL); John Hommel, Nieuw Vossemeer (NL); Machiel Boneschanscher, Baarle-Nassau (NL)

(73) Assignee: Thomson Licensing, Boulogne-Billancourt (FR)

( * ) Notice: Subject to any disclaimer, the term of this patent is extended or adjusted under 35 U.S.C. 154(b) by 610 days.

(21) Appl. No.: 11/280,768

(22) Filed: Nov. 16, 2005

(65) Prior Publication Data

US 2006/0119708 A1 Jun. 8, 2006

(30) Foreign Application Priority Data

Dec. 6, 2004 (EP) .................................. 04292883

(51) Int. Cl.
*H04N 5/232* (2006.01)
(52) U.S. Cl. ............. 348/211.1; 348/207.1; 348/207.99
(58) Field of Classification Search ............ 348/207.99, 348/207.1, 537, 211.14, 222.1
See application file for complete search history.

(56) References Cited

U.S. PATENT DOCUMENTS 4,626,914 A  12/1986 Breimer
5,325,202 A  6/1994 Washino
5,978,651 A * 11/1999 Eto et al. ................. 348/14.13
6,035,085 A  3/2000 Berger
6,345,390 B1 * 2/2002 Eto et al. ..................... 725/127
6,381,236 B1 * 4/2002 Miyashita et al. ........... 370/343

FOREIGN PATENT DOCUMENTS

DE  40 30 148 A1  3/1992
EP  0 516 378 A1  12/1992
EP  1 450 555 A1  8/2004

OTHER PUBLICATIONS

European Search Report.
European Search Report, Jun. 13, 2005.

* cited by examiner

*Primary Examiner*—David L Ometz
*Assistant Examiner*—Usman Khan
(74) *Attorney, Agent, or Firm*—Robert D. Shedd; Robert B. Levy

(57) ABSTRACT

In high-end professional video cameras a triax system is used for transferring various signals back and forth over a single coaxial cable between the camera and a base unit using frequency multiplexing. In low-cost camera systems the analogue camera CVBS video output signal is replaced by a standard serial SDI signal from the camera to a base unit, having a maximum data rate of e.g. 270 Mbit/s for standard definition TV signals. According to the invention, the camera/base unit system is locked via SDI channels whereby the base unit video output is synchronised to the base unit Genlock signal. The camera unit and the base unit each use a local oscillator and H and V counters, whereby in the camera unit only a frequency locking is carried out.

12 Claims, 4 Drawing Sheets

| Qy-0 | Qy-1 | Qy-2 | Qy-3 | Qy-4 | Qy-5 | Qy-6 | Qy-7 | Qy-8 | Qy-9 | Qy-10 | Qy-11 | Qy-12 | Qy-13 | Qy-14 | Qy-15 |
|---|---|---|---|---|---|---|---|---|---|---|---|---|---|---|---|
| Highest group value (8 bit) | | | | | | | | Lowest group value (8 bit) | | | | | | | |
Fig.4
| Qc-0 | Qc-1 | Qc-2 | Qc-3 | Qc-4 | Qc-5 | Qc-6 | Qc-7 | Qc-8 | Qc-9 | Qc-10 | Qc-11 | Qc-12 | Qc-13 | Qc-14 | Qc-15 | Qc-16 | Qc-17 |
|---|---|---|---|---|---|---|---|---|---|---|---|---|---|---|---|---|---|
| Highest group value (8 bit) | | | | | | | | Lowest group value (8 bit) | | | | | | | | * | * |
Fig.5
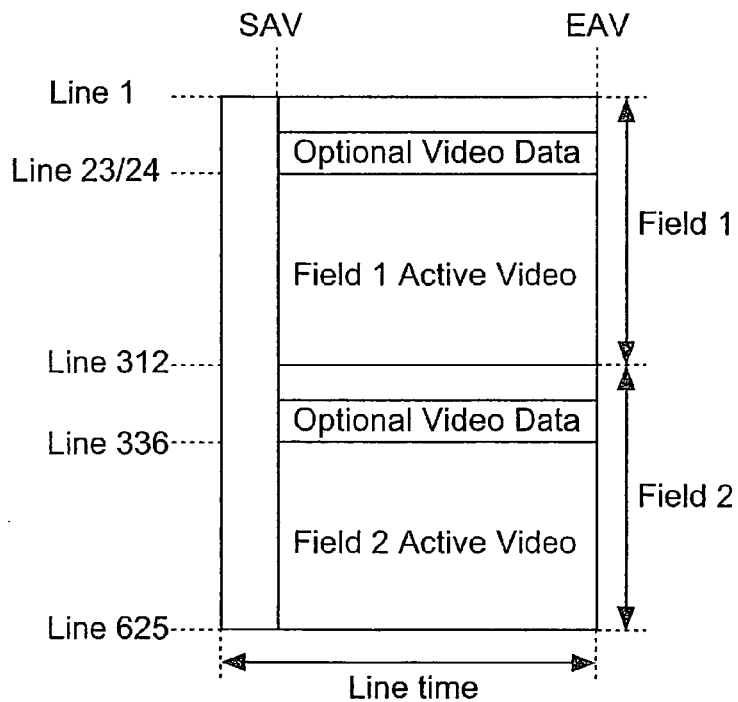
Fig.6
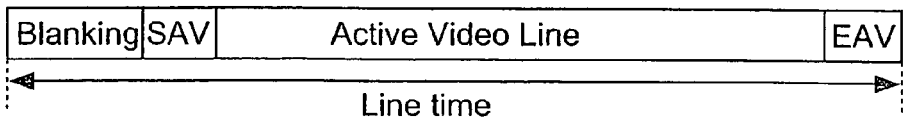
Fig.7

SYNCHRONISING A BASE UNIT AND A CAMERA UNIT WHICH ARE CONNECTED BY TWO OPPOSITE-DIRECTION DIGITAL VIDEO SIGNAL CONNECTIONS

FIELD OF THE INVENTION

The invention relates to synchronizing a base unit and a camera unit which are connected by two opposite-direction digital video signal connections, e.g. SDI or HDSDI format links.

BACKGROUND OF THE INVENTION

In the upper part of the market of professional video cameras a triax system is used for transferring various signals back and forth over a coaxial cable between a camera and a base unit. Transferring multiple signals in different direction over a single cable is feasible because frequency multiplexing is used in which to every type of signal a separate frequency band is assigned.

In the lower part of the market a multi-core adapter solution is currently being used.

In earlier systems all signals were transferred as analog signals over separate wires or cables. Because no frequency multiplex/de-multiplex is required such solution is much cheaper. However, a disadvantage is that the maximum distance between camera and base unit is restricted to about 100 meters, that the signals on the receiving side need to be equalised and that every additional meter of cable has a negative influence on the signal quality, e.g. the S/N ratio.

In current systems the analogue camera CVBS video output signal (Chroma Video Blanking Signal) is replaced by a standard serial SDI signal (Serial Digital Interface) achieving a maximum data rate of e.g. 270 Mbit/s, 143 Mbit/s, 360 Mbit/s or 540 Mbit/s for SDTV and 1.485 Gbit/s for HDTV over a coaxail cable. The SDI video signal has a word length of 10 bit and a multiplexed 4:2:2 format. Its clock rate is 27 MHz. It is standardised in ANSI/SMPTE 259M and ANSI/SMPTE 125M.

At the receiving base unit this SDI signal is re-clocked and/or converted to CVBS format or Y-$C_r$-$C_b$ format. Thereby a degradation of the quality of the CVBS signal can be avoided. All the other signals in the multi-core cable remain in analog format. For the locking of the camera to the base unit, analog control voltages are fed to the camera. Currently the return channels are transported in analog format, and are not locked to the system.

SUMMARY OF THE INVENTION

The base unit is locked to a Genlock signal, i.e. a signal that can be used to extract sync signals. The camera is to be locked to this signal as well. It is desirable to connect base unit and camera unit with a digital uplink as well as a digital downlink using SDI or HDSDI connections. However, thereby a synchronization of such multicore SDI system is required including a synchronization of the return channels.

A problem to be solved by the invention is to provide a synchronization of two opposite-direction digital video links, which have a format like SDI or HDSDI, without using additional control links for the synchronization, e.g. analog control voltages.

The camera/base unit system is locked via SDI channels, whereby at top level the base unit video output is synchronised to the base unit Genlock signal. The Genlock input is e.g. a blackburst signal and contains H (horizontal sync), V (vertical sync), F and/or colour subcarrier identification information. The colour subcarrier information is represented by an eight-field ID in PAL or by a four-field ID in NTSC.

For SDI links the jitter performance is critical. If fibre is used as transport medium for the SDI channels, timing issues will become more complex.

The output timing is adjustable with respect to the Genlock input, and is independent from the length of the cable between camera and base unit.

In case of using SDI connections for a standard resolution video system, the camera unit and the base unit each use a local 27 MHz oscillator for the inventive synchronization. Also, each one of the two units uses a H counter as well as a V counter, whereby in the camera unit only a frequency locking is carried out. The base unit in addition uses a phase comparator. For HD systems a similar synchronization approach is used but the local oscillators run at 74 MHz (74.25 or 74.178 MHz).

The return data stream from the base unit to the camera unit can carry two video signals, e.g. TP and/or Playback video, using data reduction. The full word length of the SDI/HDSDI data words is therefore in each case split into two shorter-wordlength data words representing the original data words of the two video signals, whereby these two video signals become automatically synchronised with the overall system.

In principle, the inventive method is suited for synchronizing a base unit and a camera unit, whereby a first digital video signal is being transferred from said camera unit to said base unit and a second digital video signal is being transferred from said base unit to said camera unit, said first and second digital video signals each including horizontal and vertical and/or F synchronization signals, said method including the steps:

receiving and evaluating basic synchronization information items and receiving desired synchronization information items, said basic synchronization information items evaluation providing an F-genlock signal and an H-genlock signal and said desired synchronization information items including an F-phase signal and an H-phase signal;

deriving from said F-genlock and F-phase signals and from an actual F signal value received in said base unit together with said first digital video signal an F value that controls together with a base unit clock signal a base unit vertical counter, and including the resulting vertical count values in said second digital video signal;

also including in said second digital video signal horizontal count values output from a horizontal counter that is controlled by said base unit clock signal, and including said base unit clock signal and a base unit video signal;

generating in said base unit said base unit clock signal under control of said H-genlock and H-phase signals and a second output signal from said horizontal counter;

in said camera unit, deriving from said second digital video signal H and F values using the clock signal received from said second digital video signal, and generating from said H and F values and from a camera unit clock signal horizontal count values and vertical count values using a camera unit horizontal counter and a camera unit vertical counter, respectively;

generating in said camera unit said camera unit clock signal under control of said clock signal received from said second digital video signal;

assembling in said camera unit said first digital video signal using a camera video signal, said camera unit clock signal and said camera unit horizontal count values and vertical count values;

in said base unit, outputting said camera video signal in a temporally synchronised manner from a first-in first-out memory under control of said base unit clock signal, whereby said camera video signal included in said first digital video signal as received by said base unit is fed to said first-in first-out memory under control of the clock signal assembled with said first digital video signal.

In principle the inventive system is suited for synchronizing a base unit and a camera unit, whereby a first digital video signal is being transferred from said camera unit to said base unit and a second digital video signal is being transferred from said base unit to said camera unit, said first and second digital video signals each including horizontal and vertical and/or F synchronization signals, said system including:

means for receiving and evaluating basic synchronization information items and means for receiving desired synchronization information items, said basic synchronization information items evaluation providing an F-genlock signal and an H-genlock signal and said desired synchronization information items including an F-phase signal and an H-phase signal;

means for deriving from said F-genlock and F-phase signals and from an actual F signal value received in said base unit together with said first digital video signal an F value that controls together with a base unit clock signal a base unit vertical counter;

means for including the resulting vertical count values in said second digital video signal, and for also including in said second digital video signal horizontal count values output from a horizontal counter that is controlled by said base unit clock signal, and for including said base unit clock signal and a base unit video signal;

means for generating in said base unit said base unit clock signal under control of said H-genlock and H-phase signals and of a second output signal from said horizontal counter;

in said camera unit, means for deriving from said second digital video signal H and F values using the clock signal received from said second digital video signal;

a camera unit horizontal counter and a camera unit vertical counter generating from said H and F values and from a camera unit clock signal horizontal count values and vertical count values, respectively;

means for generating in said camera unit said camera unit clock signal under control of said clock signal received from said second digital video signal;

means for assembling in said camera unit said first digital video signal using a camera video signal, said camera unit clock signal and said camera unit horizontal count values and vertical count values;

in said base unit, a first-in first-out memory for outputting said camera video signal in a temporally synchronised manner under control of said base unit clock signal, whereby said camera video signal included in said first digital video signal as received by said base unit is fed to said first-in first-out memory under control of the clock signal assembled with said first digital video signal.

BRIEF DESCRIPTION OF THE DRAWINGS

Exemplary embodiments of the invention are described with reference to the accompanying drawings, which show in:

FIG. 4 Y group of values of a data block;
FIG. 5 C group of values of a data block;
FIG. 6 2-D representation of a complete picture;
FIG. 7 sections of a complete line.

DETAILED DESCRIPTION OF PREFERRED EMBODIMENTS

Figure 1:
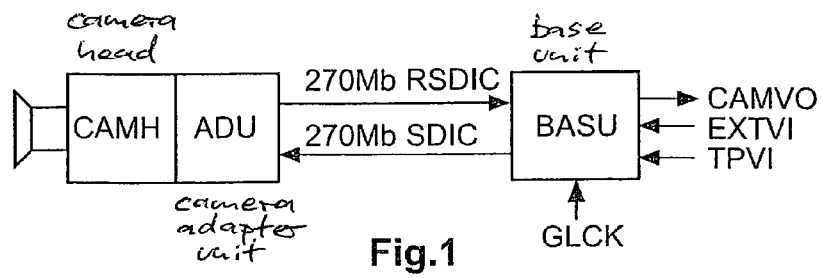
FIG. 1 a camera/base unit system including an SDI downlink and an SDI uplink connection.

In FIG. 1 a camera adapter unit ADU is attached to a camera head CAMH. A base unit BASU receives a Genlock signal GLCK (i.e. a reference signal) and may receive an external or playback video input signal EXTVI and/or a teleprompter video input signal TPVI, and outputs a camera video output signal CAMVO. The base unit sends to the adapter unit an SDI/HDSDI return data stream RSDIC carrying e.g. TP and/or Playback video, and receives from the adapter unit an SDI/HDSDI downstream SDIC carrying the camera video signal.

Figure 10:
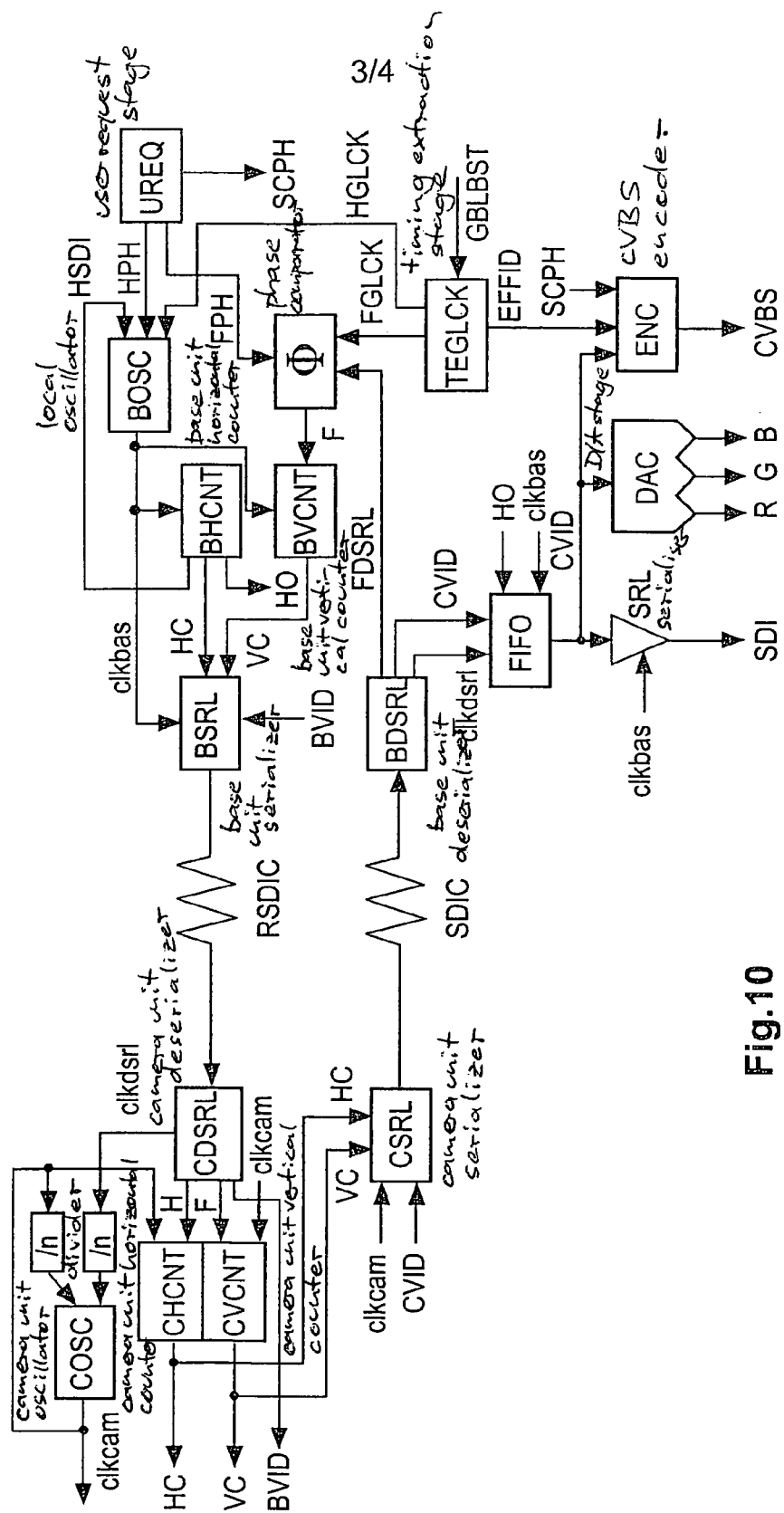
FIG. 10 block diagram of the inventive synchronization circuitry.

In FIG. 10 the left section belongs to the camera unit side and the right section belongs to the base unit side. Both sections are connected via an SDI connection SDIC transferring data from the camera unit to the base unit and via a return SDI connection RSDIC transferring data from the base unit to the camera unit.

A timing extraction stage TEGLCK receives a Genlock black-burst signal GBLBST containing H, V, F and colour subcarrier identification information. Stage TEGLCK provides an eight or four field ID signal EFFID to an optional CVBS encoder ENC, an F-genlock signal FGLCK to a phase comparator Φ and an H-genlock signal HGLCK to a base unit local oscillator BOSC. A user request stage or user input UREQ provides a desired subcarrier phase value SCPH to encoder ENC, a desired F-phase (and/or V-phase) value FPH to phase comparator Φ and a desired H-phase value HPH to local oscillator BOSC.

As a third input signal phase comparator Φ receives a de-serialised F value FDSRL, and outputs to a base unit vertical counter BVCNT a corresponding F value which is based on a clock signal clkbas.

Local oscillator BOSC also receives H-sdi signal values HSDI from a horizontal counter BHCNT. The output frequency (and phase) of BOSC is controlled by signal values HSDI, HPH and HGLCK, and it outputs a corresponding base unit clock signal clkbas to the horizontal counter BHCNT, to base unit vertical counter BVCNT, to a base unit serializer BSRL, to a first-in first-out latch FIFO and to an optional serializer SRL.

Base unit horizontal counter BHCNT also outputs a H-count value HC, which is based on clock signal clkbas, to the base unit serializer BSRL, and a H-output signal HO to FIFO. Base unit vertical counter BVCNT feeds a V-count value VC to base unit serializer BSRL.

Figure 12:
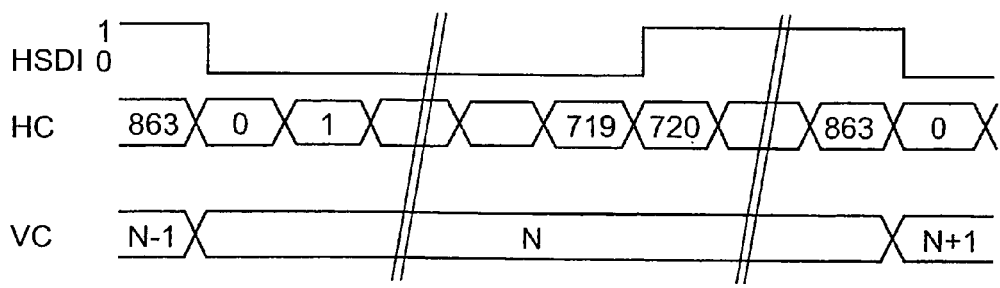
FIG. 12 HSDI signal.

Horizontal counter BHCNT counts clock pulses per line. Preferably the HC clock signal it is a 10-bit (SDTV) or 13-bit (HDTV) wide signal. Together with the V-count values VC it forms a time base which is used to generate a variety of signals used it the system, one of which signals is the HSDI signal. It is a 1-bit signal and will preferably look like is depicted in FIG. 12.

Serializer BSRL includes a pulse generator that generates H, V and F signals from the HC and VC values and from clock clkbas. BSRL performs a combination of a number of functions that are all related to generating an SDI signal: Inserting TRS sync words based on HVF, inserting CRC words and line numbers, scrambling, generation of clk ×10 or clk ×20, and serializing a 10 or 20 bits wide bus to a 1-bit output. The HC, VC and clkbas values itself are not embedded in the data stream, however they can be deducted from the stream at the receiver de-serialiser, see SMPTE standards 125, 259, 274, 292 and 296 for instance.

The output signal of serializer BSRL includes a base unit video signal BVID and the H, V and F values, which are transferred via a return SDI connection RSDIC to a camera unit de-serializer CDSRL. CDSRL outputs a H-signal value H to a camera unit horizontal counter CHCNT and an F-signal value F to a camera unit vertical counter CVCNT, and outputs the base unit video signal BVID.

Horizontal counter CHCNT receives clock signal clkcam and outputs a H-count value HC, and vertical counter CVCNT outputs a V-count value VC. VC is a 10-bit (for SDTV) or a 12-bit (for HDTV) counter. It counts lines by counting pulses from the pixel count HC. For e.g. a 625 lines system it counts from 1 to 625 or 0 to 624. The counter is reset to a certain value by the falling edge of the F pulse, thus synchronizing the counter to F. For progressive formats V (a vertical pulse signal) is used because F is always '0' in case of progressive video signals.

Camera unit de-serializer CDSRL also outputs a de-serialised clkbas clock signal clkdsrl via a first 1/n divider to a first input of a local camera unit oscillator COSC which contains a PLL. Because the bandwidth is lower than 27 MHz the 1/n dividers are added. Oscillator COSC outputs a camera unit clock signal clkcam (via a second 1/n divider) to a second input of oscillator COSC, to the horizontal counter CHCNT, to the vertical counter CVCNT, and to a camera unit serializer CSRL.

CSRL receives signals HC and VC from CHCNT/CVCNT. Again, the serializer CSRL includes a pulse generator that generates H, V and F signals from the HC and VC values and from clock clkbas. CSRL performs a combination of a number of functions that are all related to generating an SDI signal: Inserting TRS sync words based on HVF, inserting CRC words and line numbers, scrambling, generation of clk ×10 or clk ×20, and serializing a 10 or 20 bits wide bus to a 1-bit output. CSRL also receives a camera digital video signal CVID, and transfers to a base unit de-serializer BDSRL via an SDI connection SDIC an SDI format signal including camera unit video signal CVID and the H, V, and F values.

De-serializer BDSRL feeds the de-serialised camera unit video signal CVID and the de-serialised clkcam clock signal clkdsrl to the first-in first-out latch FIFO and outputs the de-serialised F value FDSRL.

The base unit 27 MHz oscillator BOSC locks frequency and H-phase by comparing its local H-pulse HSDI with the Genlock H-pulse HGLCK. For the vertical information the F-pulse FDSRL coming back from the camera unit is compared to the F-genlock FDSRL from the genlock input. The result sets the V-counter BVCNT such that the outputs of the base unit are synchronised with the Genlock input signal. By comparing the F-pulses FGLCK and FDSRL the delay from base unit to camera unit and back to the base unit is measured and compensated for.

At camera side the 27 MHz oscillator COSC is used to achieve a low-jitter clock clkcam for driving the camera-side serializer CSRL which delivers H, V and F information with the recovered clock clkcam.

The 27 MHz oscillator COSC is locked directly to the recovered 27 MHz clock clkdsrl from the de-serializer CDSRL, and is locked in frequency only. No H-phase control is involved. The camera H- and V-counters are synchronised with the recovered H-V-F-pulses from de-serializer CDSRL.

The local counters CHCNT and CVCNT are used for timing in the camera, the low-jitter clock clkcam is used to serialize the camera video signal CVID.

The base unit video output derived from register/latch FIFO can be SDI via serialization by SRL, analog R,G,B via a corresponding D/A stage DAC, and/or CVBS via encoder ENC. The output signals of the FIFO are clocked with a stable clock (clkbas) and are synchronised to the HGLCK genlock signal.

The de-serialised clock signal clkdsrl is not stable enough. It can have a jitter due to possible long cable lengths between camera and base unit, and it has an unknown sub-pixel phase with respect to clock clkbas and thus with respect to H-genlock signal HGLCK, because of unknown delay in the cable. Therefore the video signal is clocked into the FIFO with clock clkdsrl and clocked out of the FIFO with the more stable clock clkbas.

To be able to synchronize to the HGLCK signal, the FIFO has a storage capacity that is a bit greater than necessary for storage of the active video portion of a line. The active video only is clocked into the FIFO. The H-output signal HO is high during the active video portion of the output signal, controlled by H-genlock signal HGLCK through the BHCNT horizontal counter. The HO signal is used as read request/enable of the FIFO. In this way the FIFO adds some extra delay to the delay already existing in the system until it is exactly n lines, whereby n is one or more depending on the SDI cable length. These n lines can be compensated for in base unit vertical counter BVCNT by comparing FDSRL and FGLCK in phase comparator Φ.

Other implementations of horizontal and vertical synchronizations are possible.

For transferring both, a reference video input signal EXTVI and a teleprompter video input signal TPVI via the single SDI/HDSDI return data stream RSDIC, a video data compression can be applied. For example, a differential pulse code modulation (DPCM) or a one-dimensional adaptive dynamic range compression (ADRC) is used to reduce the data word length of the two video signals to be transmitted via the single SDI or HDSDI connection. To one of the two video signals (e.g. the teleprompter signal) a smaller data word length can be assigned than to the data word length of the other one (e.g. the playback signal), whereby the MSB bit (most significant bit) of the SDI connection is not used for carrying bits of the two compressed video signals. As an alternative, two compressed video signals having equal word length can be used whereby one video signal occupies the full range of 32 amplitude levels and the other video signal occupies a range of 31 amplitude levels.

Playback video, also known as external video, can be used by the cameraman for orientation purposes. Teleprompter video is used by news readers for displaying text on a monitor or any other display.

Figure 11:
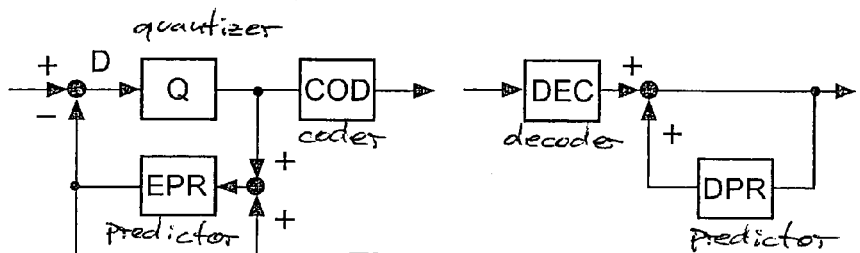
FIG. 11 DPCM encoder and decoder.

Two compressed 8-bit multiplexed 4:2:2 signals are multiplexed into one 10-bit 4:2:2 stream. DPCM data compression is well-known. In FIG. 11, along the lines the luminance and the chrominance value of a current pixel is coded as the difference between the predicted pixel value and the true pixel value, whereby the prediction (EPR) is made based on one or more previously coded pixels located to the left and/or above the current pixel, i.e. a weighted sum of neighbouring pixels. The difference D between the predicted and the current sample values is determined, quantised (Q) and coded (COD). In order to avoid error propagation, each line can start with a default guess value of e.g. medium grey and no-colour, i.e. '128' in an 8-bit system. At receiver side the corresponding inverse processing is carried out. The decoder or receiver side input values are correspondingly decoded (DEC) and the correspondingly predicted (DPR) version of a decoded output value is added thereto.

The ADRC compression is described e.g. in EP-A-0926898 and is a lossy compression which requires low resources only, has a latency of less then 100 clock cycles and has a constant bit rate. The two DPCM or ADRC compressed video streams fit transparently in a standard 270 Mbit/sec serial SDI video data stream.

All other or auxiliary data signals like synchronization, data communication, private data, intercom and audio transport are also embedded in the SDI or HDSDI stream.

The advantages of the one-dimensional ADRC compression are:

low latency of less then 100 clock cycles;
it uses very little resources, i.e. it is a low-cost compression;
practically or subjectively it has no loss of horizontal and vertical resolution;
it has a constant bit rate.

A disadvantage is that there is some loss of amplitude resolution.

Figure 2:
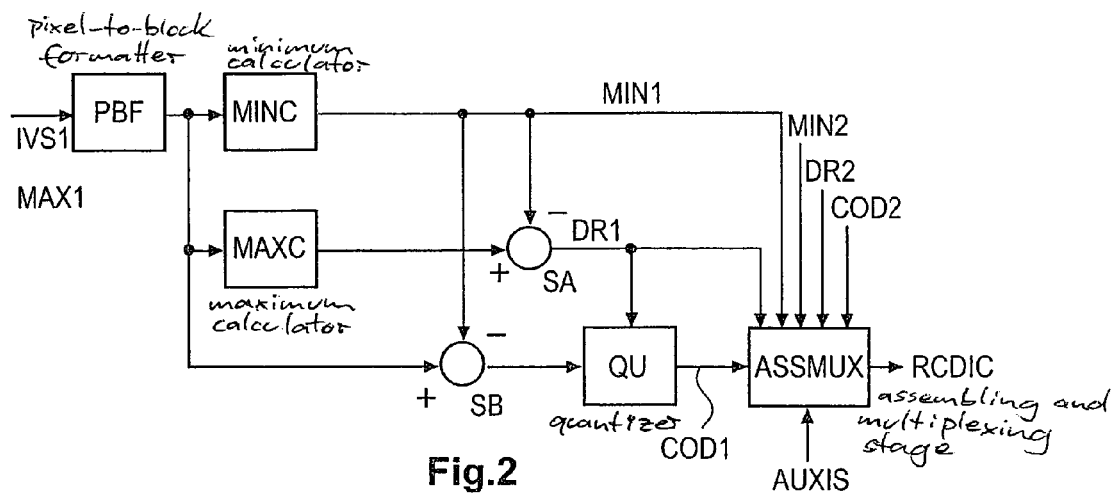
FIG. 2 ADRC encoder.

In FIG. 2 the ADRC encoder receives a digital video input signal IVS1. In the PAL, SECAM and NTSC TV systems the active video portion of one video line has 720 pixels with 1440 components. These components are arranged in a multiplexed fashion: $C_b$-Y-$C_r$-Y-$C_b$-Y-$C_r$-Y- etc., wherein Y represents an e.g. 10-bit luminance sample, $C_b$ represents an e.g. 10-bit blue-component chrominance sample and $C_r$ represents a corresponding red-component chrominance sample. The possible amplitude values for every sample occupy a slightly limited range only within the 10-bit span in order to avoid interference with a Timing Reference Signal TRS.

A corresponding video line is depicted in FIG. 7 and consists of the active video portion, a horizontal blanking section that can be used for embedding additional data and/or audio data, and a Start Active Video word SAV as well as an End Active Video word EAV. The inventive compression/decompression code replaces only the 1440 words of the active video line section.

Figure 8:
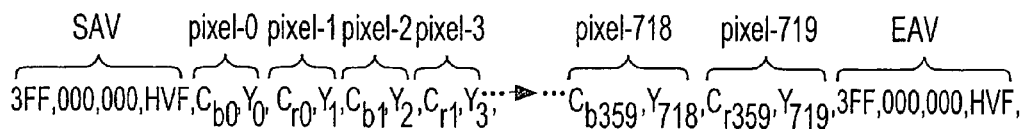
FIG. 8 components of a line.

The line arrangement is depicted in more detail in FIG. 8. The SAV and EAV sections each consist of four data word sections, each including the HVF word which is a part of the Timing Reference Signal TRS and which signals the start and stop of horizontal, vertical and frame pulses H, V and F, respectively. Some parity bits are also located in this HVF timing word allowing to check and correct HVF if necessary. The H-, V- and F-pulses represent the total timing of the picture.

How the lines are arranged as a PAL or SECAM picture frame is shown in FIG. 6. Blanking, SAV and EAV is present in every line. Field 1 and field 2 each contain in total 312.5 lines. The active portion of field 1 starts with half line 23 or full line 24 and ends with full line 310. The active portion of field 2 starts with full line 336 and ends with full line 622 or half line 623.

For NTSC, field 1 and field 2 each contain in total 262.5 lines. The active portion of field 1 starts with full line 21 and ends with full line 262 or half line 263. The active portion of field 2 starts with half line 283 or full line 284 and ends with full line 525.

E.g. 19 lines before the start of the active fields 1 and 2 may contain optional video data.

One video line includes 720 Y, 360 $C_b$ and 360 $C_r$ samples. These components are compressed separately. Returning to FIG. 2, for each component groups or blocks including e.g. 16 successive samples are formed in a pixel-to-block formatter PBF, like Y0-Y1-Y2-Y3-Y4- . . . -Y15. From each current group the highest amplitude value MAX1 and the lowest amplitude value MIN1 is determined in a maximum calculator MAXC and a minimum calculator MINC, respectively. In a first subtractor SA the MIN1 value is subtracted from the MAX1 value thereby resulting in a dynamic range value DR1 for the current group. In a second subtractor SB the MIN1 value is subtracted from each one of the original sample amplitude values of the current group, which processing step can be considered as representing a normalization. The difference signal output values of subtractor SB are fed to a quantizer QU in which they are quantised under control of the current dynamic range value DR1 such that the quantizer output signal values COD1 occupy a pre-selected fixed amplitude range only, which amplitude range (e.g. 3, 4 or 5 bit) is smaller than that occupied by the original sample amplitude values (e.g. 8 or 10 bit).

The encoder contains a second part (not depicted) which basically corresponds to the first part described above. The first part processes e.g. the playback video signal IVS1 whereas the second part processes the teleprompter video signal IVS2. The second part generates corresponding output signals MIN2, DR2 and COD2. As an alternative, the input signals IVS1 and IVS2 are both processed in a single part in a multiplexed fashion.

The sample playback video signal amplitude differences output from SB are quantised to 4 bits in a 10-bit system, and for the TP signal to 4 bits (or 3 bits) in a 10-bit system. Because the minimum value MIN and the dynamic range value DR or the maximum value MAX for each group or block are required by the decoder, these values are also transmitted. A different bit from the two current 8-bit data words for MIN and DR, or for MIN and MAX, is assigned to the different compressed data words of the current group or block, i.e. the bits of these two values form a fifth bit of the playback video signal data words and a fifth (or fourth) bit of the TP signal data words. Preferably, these additional bits are arranged at the beginning or at the end of the compressed playback signal data words and the compressed TP signal data words.

The signals MIN1, DR1, COD1, MIN2, DR2 and COD2, as well as any required or desired auxiliary input signals AUXIS are fed to an assembling and multiplexing stage ASSMUX which outputs a corresponding SDI data stream RSDIC.

Figure 3:
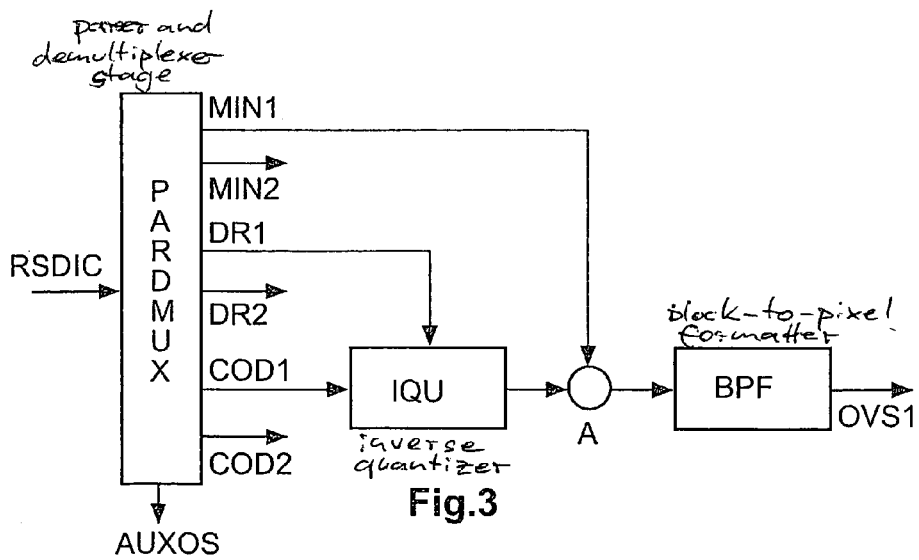
FIG. 3 ADRC decoder.

In a corresponding ADRC decoder as shown in FIG. 3 signal RSDIC enters a parser and demultiplexer stage PARDMUX which provides signals MIN1, DR1, COD1, MIN2, DR2 and COD2, as well as corresponding auxiliary output signals AUXOS. In a first part of the decoder signal COD1 is correspondingly inversely quantised in an inverse quantizer IQU under control of signal DR1. The output signal values of IQU are added in an adder A to the minimum values MIN1. The resulting reconstructed output signal samples can be fed to a block-to-pixel formatter BPF which outputs the output video signal OVS1, i.e. the pixel values of a line of the playback video signal. The corresponding second part (not depicted) of the decoder generates from the signals MIN2, DR2 and COD2 pixel values OVS2 of a line of the teleprompter video signal. Preferably, if a total or combined binary code word (i.e. TPS combined with PBS) in the combined video signal RSDIC has a value that would lie in a forbidden range then e.g. the value '512' is added in assembling and multiplexing stage ASSMUX and the corresponding value '512' is subtracted in parser and demultiplexer stage PARDMUX.

Following compression and merging of the two streams in ASSMUX or FMT care must be taken that the resulting data words do not corrupt synchronization. In other words e.g. the values '0', '1', '2', '1020', '1021', '1022' and '1023' must not occur.

In case a 5-bit and a 4-bit stream are merged one bit, e.g. the MSB, could be reserved for corruption prevention. If the constructed code words tend to get a value in the forbidden zone '0' and '1', '512' is added by e.g. setting the MSB to '1'.

However, thereby one half of the total range of 1024 values is consumed by corruption prevention. A more effective way of preventing timing corruption is to construct two 5-bit streams of which one occupies a full range of 32 values and the other one occupies only 31 values. The advantage is that only 32 values out of 1024 values are not used for video coding.

Figure 9:
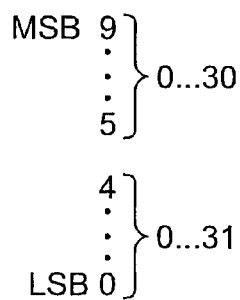
FIG. 9 an orientation of two 5-bit compressed-stream data words within data words of a 10-bit stream.

This is depicted in FIG. 9 in which in the five lower bits 32 values and in the five upper bits 31 values are used. The total range used here is 0 . . . 991 decimal 10-bit, but forbidden words '0' and '1' could occur.

If in the original compression processing values between '0' and '15' occur, '32' must be subtracted. Thereby the forbidden range '0' to '15' is shifted to the range 992 . . . 1007. Note that subtracting '32' is equivalent to adding 992(=1024−32) since the sum will always be 10 bit with no parity.

Correspondingly, in the decompression processing it is checked whether there occur values in the range 992 . . . 1007. If that is true '32' will be added.

FIG. 8 gives a short overview of the sequence of the stored components per line in the 10-bit stream around SAV and EAV. For details see the above-mentioned SMPTE/ITU standards.

For each line the active video portion of the stream is now multiplexed into three separate streams:

Multiplexed stream 1
Cb0, Cb1, Cb2, Cb3, . . . , Cb357, Cb358, Cb359
Multiplexed stream 2
Cr0, Cr1, Cr2, Cr3, . . . , Cr357, Cr358, Cr359
Multiplexed stream 3
Y0, Y1, Y2, Y3, . . . , Y717, Y718, Y719

Per line, every multiplexed stream is partitioned into sample groups. Y is partitioned into 45 groups of 16 samples each, 45*16=720. Cb and Cr are both divided as 20 groups of 18 samples each, 20*18=360. These components add up to 720+2*360=1440 samples per line. The groups or blocks generated are:

(Cb0 . . . Cb17), (Cb18 . . . Cb35), (Cb36 . . . Cb53), etc.;
(Cr0 . . . Cr17), (Cr18 . . . Cr35), (Cr36 . . . Cr53), etc.;
(Y0 . . . Y15), (Y16 . . . Y31), (Y32 . . . Y47), (Y48 . . . Y63), etc.

All samples from any group are always treated as positive numbers only. From every group the highest and lowest values $G_{highest}$, $G_{lowest}$ are determined, both are 8-bit.

The highest minus the lowest value is the group range $G_{range} = G_{highest} - G_{lowest}$.

All the samples of the group are scaled to this group range and are quantised to the available levels. Available quantization levels for external-video is '15' and for teleprompter-video '14':

$$Q_{sample(i)} = (G_{sample(i)} - G_{lowest}) * (Q_{levels} - 1) / G_{range}.$$

FIG. 4 shows how a corresponding Y group block looks like following quantization.

FIG. 5 shows how a corresponding C group block looks like following quantization.

Y and C (i.e. Cb and Cr) are quantised using the same resolution for that channel. Each 5-bit channel is build as one bit for constructing the highest/lowest group values (or the lowest group value and the dynamic range value) and four bits for quantised values. Two bits in every C-group block can be left unused, or can be used as an additional data channel. Because the groups have different lengths the colour information for an Y group is taken from either one C group or from two adjacent C groups.

Advantageously, the reconstructed stream is arranged as a components multiplex the same way as defined in the above-mentioned SMPTE standard. The highest and lowest group values are sent bit-wise together with the quantised samples of that group. The arrangement of the highest and lowest group values in the reconstructed stream is like depicted in FIGS. 10 and 11. The MSB can be sent/received first. Preferably, the LSB or the MSB within the 5-bit playback signal data words and the LSB or the MSB within the 5-bit TP signal data words represent the values MIN1/MIN2 (lowest group value) and DR1/DR2 (dynamic range value) or MAX1/MAX2 (highest group value).

The encoding formula for external-video is:

$$Q_{sample(i)} = \text{Truncate}[((G_{sample(i)} - G_{lowest}) * 15) / G_{range} + 0.5]$$

The encoding formula for teleprompter-video is:

$$Q_{sample(i)} = \text{Truncate}[((G_{sample(i)} - G_{lowest}) * 14) / G_{range} + 0.5]$$

wherein $G_{range}$, $G_{lowest}$ and $G_{sample(i)}$ have values lying between '0' and '255'. $G_{sample(i)}$ is the sample taken from the original stream.

The decoding formula for external-video is:

$$\text{Sample}_{(i)\_reconstructed} = ((G_{highest} - G_{lowest}) * Q_{(i)sample}) / 15 + G_{lowest}$$

The decoding formula for teleprompter-video is:

$$\text{Sample}_{(i)\_reconstructed} = ((G_{highest} - G_{lowest}) * Q_{(i)sample}) / 14 + G_{lowest}$$

The numbers given in this description, e.g. the clock frequencies and the word lengths, can be adapted to different applications of the invention as required.

What is claimed is:

1. A method for synchronizing a base unit and a camera unit, whereby a first digital video signal is being transferred from said camera unit to said base unit and a second digital video signal is being transferred from said base unit to said camera unit, said first and second digital video signals each including horizontal and vertical and F (field) synchronization signals, said method comprising the steps:

in said base unit, providing from a genlock signal an F-genlock signal and a horizontal genlock signal and providing from user request or input an F-phase signal and a horizontal phase signal;

in said base unit, comparing in a phase comparator said F-genlock signal and an actual F signal value received from said camera unit and providing therefrom an F value that controls together with a base unit clock signal a base unit vertical counter by setting it such that said second digital video signal is synchronized with said genlock signal, wherein said phase comparator is also controlled by said F-phase signal and wherein said vertical counter counts lines;

in said base unit, generating count values output from a horizontal counter that is controlled by said base unit clock signal, wherein said horizontal counter counts clock pulses per line;

in said base unit, generating said base unit clock signal under control of said horizontal genlock and horizontal phase signals and an output signal from said horizontal counter;

in said base unit, combining said second digital video signal from a base unit video signal and said horizontal and vertical and F synchronization signals, wherein said horizontal and vertical and F synchronization signals are generated from said horizontal count values and the count values of said vertical counter and said base unit clock signal;

in said camera unit, deriving from said second digital video signal horizontal sync and F values using the clock signal received from said second digital video signal, and generating from said horizontal sync and F values and from a camera unit clock signal horizontal count values and vertical count values using a camera unit horizontal counter and a camera unit vertical counter, respectively;

in said camera unit, generating said camera unit clock signal under control of said clock signal received from said second digital video signal;

in said camera unit, assembling said first digital video signal using a camera video signal, said camera unit clock signal and said camera unit horizontal count values and vertical count values;

in said base unit, outputting said camera video signal in a temporally synchronized manner from a frst-in first-out memory under control of said base unit clock signal, whereby said camera video signal included in said first digital video signal as received by said base unit is fed to said first-in first-out memory under control of the clock signal obtained from said first digital video signal.

2. The method according to claim 1, wherein: said combining of said second digital video signal is carried out in a base unit serializer that outputs said second digital video signal to said camera unit;

said deriving of said second digital video signal horizontal sync and F values using the second digital video signal clock signal is carried out in a camera unit de-serializer that receives said second digital video signal;

said assembling is carried out in a camera unit serializer that outputs said first digital video signal to said base unit;

said first digital video signal passes through a base unit de-serializer before said camera video signal included in said first digital video signal as received by said base unit is fed to said first-in first-out memory.

3. The method according to claim 1, wherein said first digital video signal and said second digital video signal have an SDI or HDSDI format.

4. The method according to claim 3, wherein said second digital video signal is a combined video signal including two different data compressed video signals, for example a teleprompter signal and a playback signal.

5. The method according to claim 4, wherein said data compressed video signals are DPCM compressed.

6. The method according to claim 4, wherein said data compressed video signals are ADRC compressed.

7. A System for synchronizing a base unit and a camera unit, whereby a first digital video signal is being transferred from said camera unit to said base unit and a second digital video signal is being transferred from said base unit to said camera unit, wherein said first and second digital video signals each include horizontal and vertical and F synchronization signals, wherein F denotes 'field', said system comprising:

in said base unit, means for providing from a genlock signal an F-genlock signal and a horizontal genlock signal and user request or input means for providing an F-phase signal and a horizontal phase signal;

in said base unit, a phase comparator for comparing said F-genlock signal and an actual F signal value (FDSRL) received from said camera unit and for providing therefrom an F value that controls together with a base unit clock signal a base unit vertical counter by setting it such that said second digital video signal is synchronized with said genlock signal, wherein said phase comparator is also controlled by said F-phase signal and wherein said vertical counter counts lines;

in said base unit, a horizontal counter for generating horizontal count values, said horizontal counter being controlled by said base unit clock signal and counting clock pulses per line;

in said base unit, means for generating said base unit clock signal under control of said horizontal genlock and horizontal phase signals and of an output signal from said horizontal counter;

in said base unit, means for combining said second digital video signal from a base unit video signal and said horizontal and vertical and F synchronization signals, wherein said horizontal and vertical and F synchronization signals are generated from said horizontal count values and the count values of said vertical counter and said base unit clock signal;

in said camera unit, means for deriving from said second digital video signal horizontal sync and F values using the clock signal received from said second digital video signal;

a camera unit horizontal counter and a camera unit vertical counter generating from said horizontal sync and F values and from a camera unit clock signal horizontal count values and vertical count values, respectively;

in said camera unit, means for generating said camera unit clock signal under control of said clock signal received from said second digital video signal;

in said camera unit, means for assembling said first digital video signal using a camera video signal, said camera unit clock signal and said camera unit horizontal count values and vertical count values;

in said base unit, a first-in first-out memory for outputting said camera video signal in a temporally synchronized manner under control of said base unit clock signal, whereby said camera video signal included in said first digital video signal as received by said base unit is fed to said first-in first-out memory under control of the clock signal obtained from said first digital video signal.

8. The system according to claim 2, wherein:

said means combining said second digital video signal is a base unit serializer that outputs said second digital video signal to said camera unit;

said means for deriving said second digital video signal horizontal sync and F values using the second digital video signal clock signal is a camera unit de-serializer that receives said second digital video signal;

said means for assembling is a camera unit serializer that outputs said first digital video signal to said base unit;

said base unit includes a base unit de-serializer which receives said first digital video signal and outputs said camera video signal included in said first digital video signal to said first-in first-out memory.

9. The system according to claim 2, wherein said first digital video signal and said second digital video signal have an SDI or HDSDI format.

10. The system according to claim 9, wherein said second digital video signal is a combined video signal including two different data compressed video signals, for example a teleprompter signal and a playback signal.

11. The system according to claim 10, wherein said data compressed video signals are DPCM compressed.

12. The system, according to claim 10, wherein said data compressed video signals are ADRC compressed.

* * * * *